United States Patent
Obeng et al.

(10) Patent No.: US 10,152,666 B2
(45) Date of Patent: Dec. 11, 2018

(54) AUTHENTICATION ARTICLE AND PROCESS FOR MAKING SAME

(71) Applicants: NATIONAL INSTITUTE OF STANDARDS AND TECHNOLOGY, Gaithersburg, MD (US); Jung-Joon Ahn, Gaithersburg, MD (US)

(72) Inventors: Yaw S. Obeng, Frederick, MD (US); Joseph J. Kopanski, Bethesda, MD (US); Jung-Joon Ahn, Gaithersburg, MD (US)

(73) Assignee: THE UNITED STATES OF AMERICA, AS REPRESENTED BY THE SECRETARY OF COMMERCE, Washington, DC (US)

( * ) Notice: Subject to any disclaimer, the term of this patent is extended or adjusted under 35 U.S.C. 154(b) by 146 days.

(21) Appl. No.: 14/833,187

(22) Filed: Aug. 24, 2015

(65) Prior Publication Data
US 2015/0363682 A1  Dec. 17, 2015

Related U.S. Application Data

(60) Provisional application No. 62/103,704, filed on Jan. 15, 2015.

(51) Int. Cl.
*G06K 19/06* (2006.01)
*G06K 7/12* (2006.01)

(52) U.S. Cl.
CPC ....... *G06K 19/06159* (2013.01); *G06K 19/06* (2013.01); *G06K 7/12* (2013.01); *G06K 19/0614* (2013.01); *G06K 19/06037* (2013.01)

(58) Field of Classification Search
CPC .... G06K 19/06159; G06K 19/06; G06K 7/12; G06K 19/0614; G06K 19/06037
See application file for complete search history.

(56) References Cited

U.S. PATENT DOCUMENTS

| 6,251,755 B1 | 6/2001 | Furukawa et al. |
| 2002/0137059 A1* | 9/2002 | Wu ..................... B01J 19/0046 435/6.19 |

(Continued)

OTHER PUBLICATIONS

Fuechsle, M., et al., A single-atom transistor, Nature Nanotechonology, 2012, 242-246, 7.

(Continued)

*Primary Examiner* — Sonji Johnson
(74) *Attorney, Agent, or Firm* — Office of Chief Counsel for National Institute of Standards and Technology

(57) ABSTRACT

An authentication article includes: a substrate including: a first surface; a second surface disposed laterally to the first surface and at a depth below the first surface; and a plurality of indentations including the depth at the second surface of the substrate; and an array disposed on the substrate and including a plurality of analytes, the analytes being disposed in the indentations at a depth below a first surface of the substrate and provided to emit an authentication signature in response to being subjected to a probe stimulus. A process for authenticating the authentication article includes: providing the authentication article; subjecting the analytes to a probe stimulus; acquiring a response from the plurality of analytes in response to being subjected to the probe stimulus; and determining whether the response is the authentication signature to authenticate the, wherein the authentication article is not authenticated if the response is not the authentication signature for the array.

15 Claims, 14 Drawing Sheets

(56) References Cited

U.S. PATENT DOCUMENTS

| | | | | |
|---|---|---|---|---|
| 2007/0170257 | A1* | 7/2007 | Haraszti | B42D 15/0033 235/454 |
| 2008/0217931 | A1* | 9/2008 | Bourrieres | E05B 39/00 292/307 A |
| 2013/0112755 | A1* | 5/2013 | Allen | G06K 19/067 235/492 |
| 2013/0306737 | A1* | 11/2013 | Freeman | G06K 19/06037 235/488 |
| 2015/0102105 | A1* | 4/2015 | Perret | G06K 19/06046 235/440 |

OTHER PUBLICATIONS

Taur, Y., et al., On-off charge-voltage characteristics and dopant number fluctuation effects in junctionless double-gate MOSFETs, IEEE Transaction on Electron Devices, 2012, 863-866, 59 (3).

Kang, M-S., et al., Metal work-function-dependent barrier height of Ni contacts with metal-embedded nanoparticles to 4H—SiC, Nanoscale Research Letters, 2012.

Shinada, T., et al., Enhancing semiconductor device performance using ordered dopant arrays, Nature, 2005, 1128-1131, 437.

Kambayashi, H., et al., Normally off n-channel GaN MOSFETs on Si substrates using an SAG technique and ion implantation, IEEE Electron Device Letters, 2007, 1077-1079, 28(12).

Fotiadis, D., et al., Rhodopsin dimers in native disc membranes, Nature, 2003, 127-128, 421.

Giessibl, F., Advanced in atomic force microscopy, Reviews of Modern Physics, 2003, 949-983, 75.

Garcia, R., et al., Dynamic atomic force microscopy methods, Surface Science Reports, 2002, 197-301, 47.

Gross, L., et al., The chemical structure of a molecule resolved by atomic force microscopy, Science, 2009, 1110-1114, 325.

Avouris, P., et al., Atomic force microscope tip-induced local oxidation of silicon: kinetics mechanism, and nanofabrication, Appl. Phys. Lett., 1997, 285-287, 71.

Ahn, J-J., et al., Cystallographic plane-orientation dependent atomic force microscopy-based local oxidation of silicon carbide, Nano Express, 2011.

Bhushan, B., et al., Nanoindentation hardness measurements using atomic force microscopy, Appl. Phys. Lett., 1994, 1653-1655, 64.

Vanlandingham, M.R., et al., Relating elastic modulus to indentation response using atomic force microscopy, Journal of Materials Science Letters, 1997, 117-119, 16.

Pharr, G.M., Measurement of mechanical properties by ultra-low load indentation, Materical science and engineering, 1998, 151-159.

Herbert, E.G., et al., On the measurement of stress-strain curves by spherical indentation, Thin Solid Films, 2001, 331-335.

Cao, Y. et al., Nanoindentation measurements of the mechanical properties of polycrystalline Au and Ag thin films on silicon substrates: Effects of grain size and film thickness, Materials Science and Engineering, 2006, 232-240.

Monclus, M.A., et al., AFM indentation method used for elastic modulus characterization of interfaces and thin layers, Journal Mater Science, 2010, 3190-3197.

Roa, J.J., et al., AFM as an alternative for Young's modulus determination in ceramic materials in elastic deformation regime, Physica C, 2011, 544-548.

Kelchner, C.L., et al., Dislocation nucleation and defect structure during surface indentation, Physical Review B, 1998, 11085-11088, 58 (17).

Bolshakov, A., et al., Influences of pileup on the measurement of mechanical properties by load and depth sensing indentation techniques, Journal of Materials Research, 1998, 1049-1058, 13(4).

Kramer, D.E. et al., Substrate effects on indentation plastic zone development in thin soft films, Journal Material Research, 2001, 3150-3157, 16(11).

Gerberich, W.W., et al., Nanoindentation-induced defect-interface interactions: phenomena, methods, and limitations, Acta Mater., 1999, 4115-4123, 47(15).

Homma, T., et al., Raman microscopy and scanning surface potential microscopy analysis of nanoscale defects on Si wafer surfaces, Journal of the Electrochemical Society, 2009, H475-H478, 156.

Nonnenmacher, M., et al., Kelvin probe force microscopy, Applied Physics Letters, 1991, 2921-2923, 58.

Kikukawa, A.,et al., Silicon on junction imaging and characterization using sensitivity enhanced Kelvin probe force microscopy, Applied Physics Letters, 1995, 3510-3512, 66.

Kitamura, A., et al., High-resolution imaging of contact potential difference with ultrahigh vacuum noncontact atomic force microscope, Applied Physics Letters, 1998, 3154-3156, 72(24).

Ziegler, D., et al., Force gradient sensitive detection in lift-mode Kelvin probe force microscopy, Nanotechnology, 2011, 22.

Ziegler, D., et al., Variations in the work function of doped single- and few-layer graphene assessed by Kelvin probe force microscopy and density functional theory, Physical Review B, 2011, 235151-1-235434-7, 83.

Ho, J.C., et al., Controlled nanoscale doping of semiconductors via molecular monolayers, Nature Materials, 2008, 62-67, 7.

Lakafosis, V., et al., RF Fingerprinting Physical Objects for Anticounterfeiting Applications, IEEE Trans. Microwave Theory and Techniques, 2011, 504-514, 59(2).

Schulze, A., et al., A comprehensive model for the electrical nanocontact on germanium for scanning spreading resistance microscopy applications, J. Appl. Phys. 2013, 114310, 113.

Ruffell,S., et al., Room temperature writing of electrically conductive and insulating zones in silicon by nanoindentation, Applied Physics Letters, 2011, 052105, 98.

* cited by examiner

AUTHENTICATION ARTICLE AND PROCESS FOR MAKING SAME

CROSS REFERENCE TO RELATED APPLICATIONS

This application claims the benefit of U.S. Provisional Patent Application Ser. No. 62/103,704 filed Jan. 15, 2015, the disclosure of which is incorporated herein by reference in its entirety.

STATEMENT REGARDING FEDERALLY SPONSORED RESEARCH

This invention was made with United States government support from the National Institute of Standards and Technology. The government has certain rights in the invention.

BRIEF DESCRIPTION

Disclosed is an authentication article comprising: a substrate comprising: a first surface; a second surface disposed laterally to the first surface and at a depth below the first surface; and a plurality of indentations comprising the depth at the second surface of the substrate; and an array disposed on the substrate and comprising a plurality of analytes, the analytes being disposed in the indentations and provided to emit an authentication signature in response to being subjected to a probe stimulus.

Further disclosed is a process for making an authentication article, the process comprising: providing a substrate; disposing a precursor on the substrate; contacting the precursor with an indenter; subjecting, by the indenter, the precursor to an indenting force; indenting, by the indenting force, the substrate; forming an indentation in the substrate; forming an analyte disposed in the indentation from the precursor; and forming an array comprising a plurality of analytes disposed individually in a plurality of indentations to form the authentication article.

Additionally disclosed is a process for authenticating an authentication article, the process comprising: providing an authentication article comprising a substrate comprising: a first surface; a second surface disposed laterally to the first surface and at a depth below the first surface; and a plurality of indentations comprising the depth at the second surface of the substrate; and an array disposed on the substrate and comprising a plurality of analytes, the analytes being disposed in the indentations at a depth below a first surface of the substrate and provided to emit an authentication signature in response to being subjected to a probe stimulus; subjecting the analytes to a probe stimulus; acquiring a response from the plurality of analytes in response to being subjected to the probe stimulus; and determining whether the response is the authentication signature to authenticate the, wherein the authentication article is not authenticated if the response is not the authentication signature for the array.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

It has been discovered that an authentication article and process for making the authentication article herein provide a rapid, reproducible, and scalable array that includes a deterministic disposal of analytes in an indentation on a substrate for a selected authentication signature. The array includes a structure at the nanoscale of the analytes. The substrate can be, e.g., a manufactured item such as integrated circuit, pharmaceutical, and the like that is uniquely identifiable by the analytes in the array. It is contemplated that the authentication article provides a secure Internet of things and substantially impacts successful passing off of counterfeit products.

Figure 1:
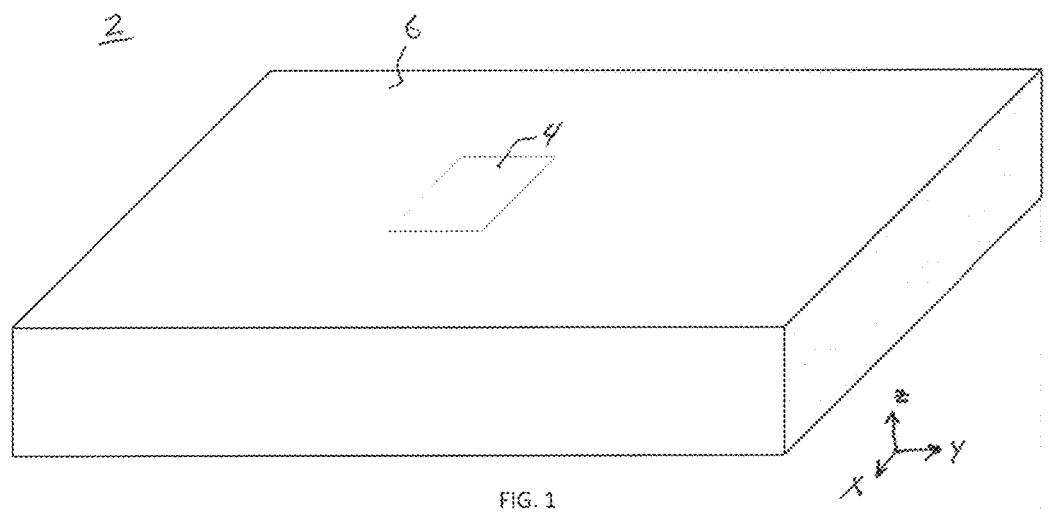
FIG. 1 shows a perspective view of an authentication article.
Figure 2:
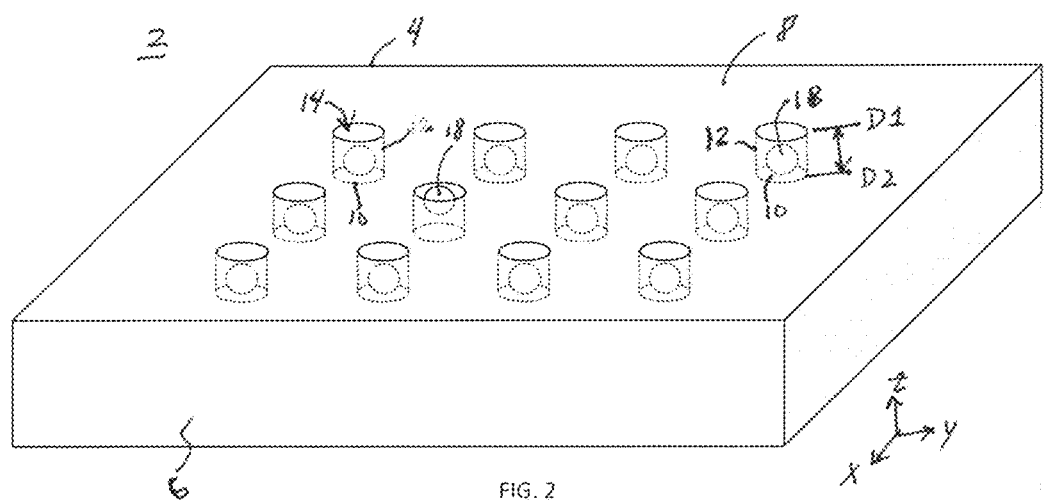
FIG. 2 shows an enlarged perspective view of an array of the authentication article shown in FIG. 1.
Figure 3:
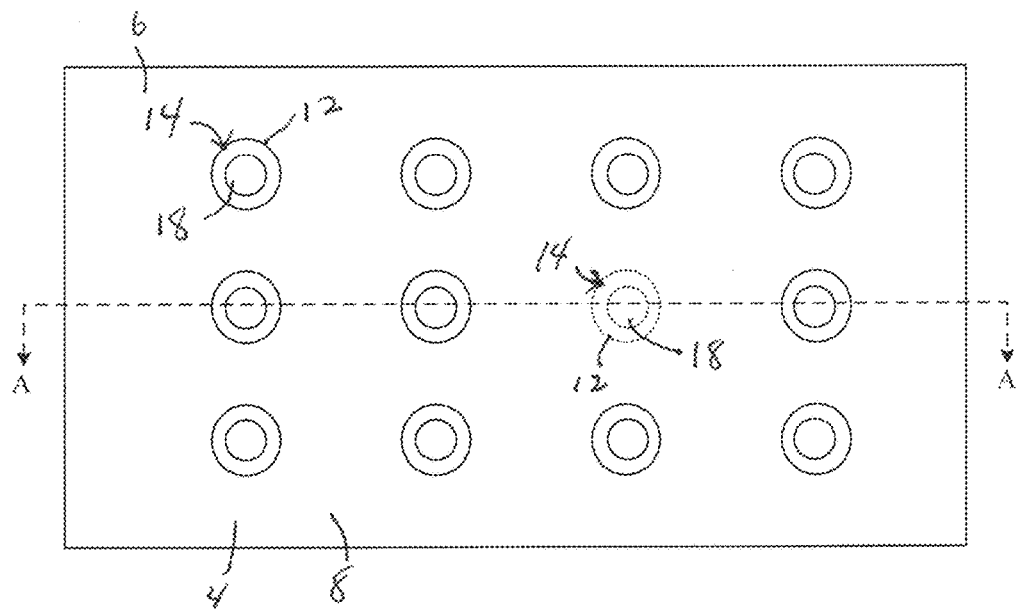
FIG. 3 shows a top view of the array shown in FIG. 2.
Figure 4:
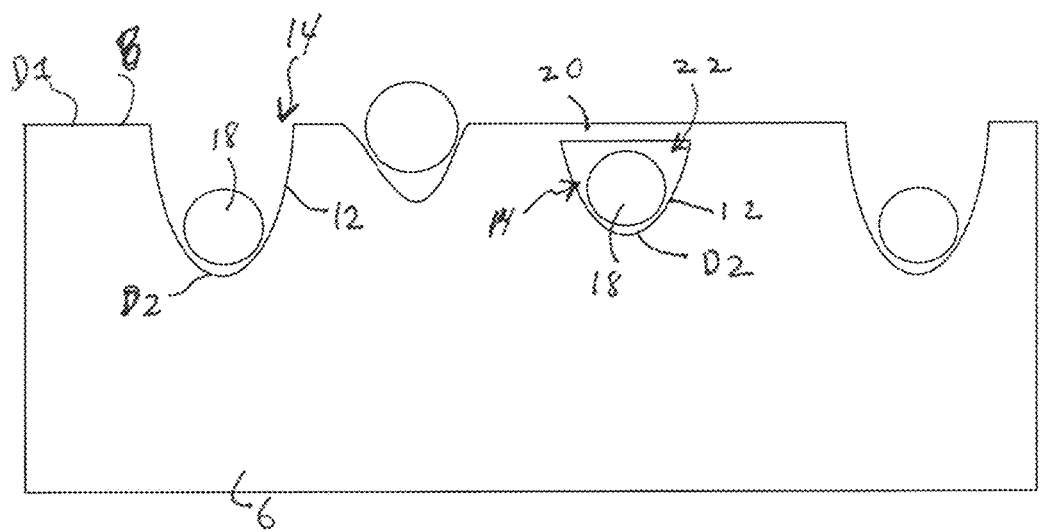
FIG. 4 shows a cross-section along line A-A of the array shown in FIG. 3.

In an embodiment, as shown in FIG. 1 (a perspective view of authentication article 2), FIG. 2 (an enlarged perspective view of array 4 of authentication article 2 shown in FIG. 1), FIG. 3 (a top view of array 4 shown in FIG. 2), and FIG. 4

(a cross-section along line A-A of array 4 shown in FIG. 3), authentication article 2 includes array 4 disposed on substrate 6. Array 4 includes a plurality of indentations 14 disposed in substrate 6. Substrate 6 includes first surface 8 at first depth D1. Indentation 4 includes second surface 10 disposed at second depth D2 such that second surface 10 is disposed laterally to first surface 8 at second depth D2 below first surface 8. Here, wall 12 bounds indentation 14 as a peripheral surface thereof. Array 4 further includes a plurality of analytes 18 disposed in indentations 14. Analyte 18 is provided to emit an authentication signature in response to being subjected to a probe stimulus. Analyte 18 can be completely disposed within indentation 14. In some embodiments, analyte 18 is partially disposed in indentation 14 such that a portion of analyte 18 is disposed above first surface 10, and a portion of analyte 18 is disposed below first surface 10 within indentation 14 as shown in FIG. 2. With regard to FIG. 4, in a certain embodiment, analyte 18 is disposed completely in indentation 14 in pore 22 and covered by overlayer 20.

Figure 5:
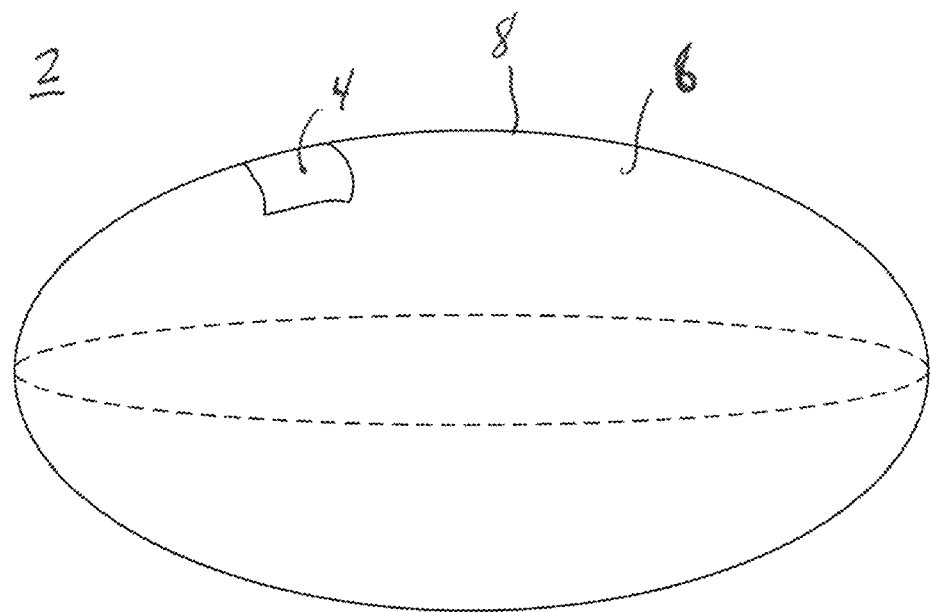
FIG. 5 shows a perspective view of an authentication article.
Figure 6:
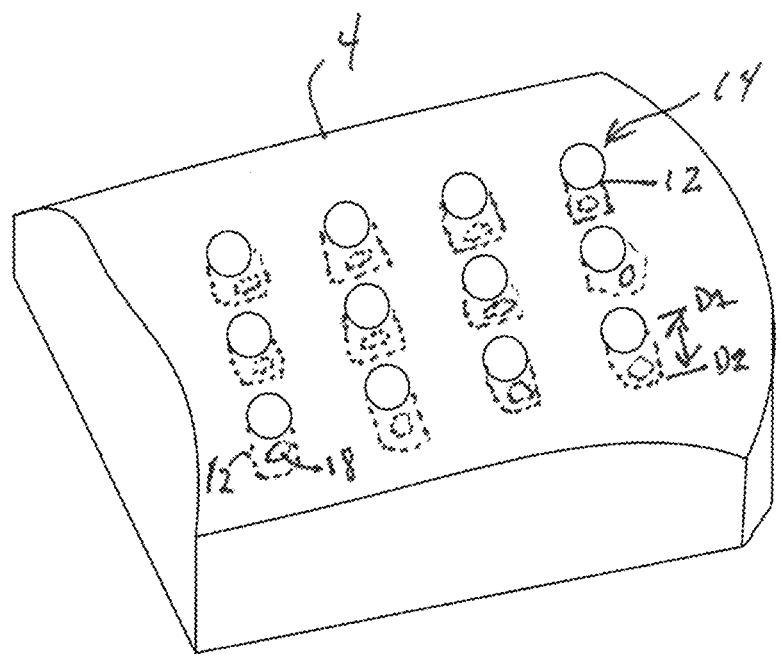
FIG. 6 shows an enlarged perspective view of an array of the authentication article shown in FIG. 5.

A shape of first surface 8 of substrate 6 can be planar, nonplanar, or combination thereof. According to an embodiment, as shown in FIG. 5, authentication article 2 includes substrate 6 having first surface 8 that is curved on which array 4 is disposed. FIG. 6 shows an enlarged perspective view of array 4 that includes indentation 14 bounded by wall 12 and having second surface 10 at second depth D2. Here, analyte 18 is disposed in indentation 14.

Substrate 8 can include a paper, polymer, semiconductor, electrical insulator, ceramic, glass, wood, a composite thereof, or a combination thereof. In an embodiment, substrate 8 includes a laminate structure of such material.

In an embodiment, analytes 18 are formed by indenting precursor 24 into substrate 6 to form indentation 14. The precursors disposed on substrate 6 prior to being subjected to an indenting force to form analyte 18 independently include a transition metal (e.g., from group 3 to group 12 of the periodic table such as an element from group 10, group 11, group 12, and the like); a p-block element such as an element from group 13, group 15, group 16 of the periodic table, and the like; an allotrope of carbon; or a combination thereof. Exemplary transition metals and coinage metals such as nickel, silver, gold, and the like. Exemplary p-block elements include aluminum, phosphorus, an oxide thereof, and the like. Under the indenting force applied to precursor 24, precursor 24 is converted to analyte 18. According to an embodiment, a metal oxide (e.g., aluminum oxide) is disposed as precursor 24 and arranged in a geometry to form array 4 on substrate 6 and subjected to the indenting force. Under the pressure and increased temperature produced by the indenting force on precursor 24, precursor 24 metal oxide (e.g., aluminum oxide) is converted to analyte 18 (e.g., aluminum) disposed in indentation 14 formed by deformation of substrate 6 by the indenting force.

It is contemplated that precursor 24 and analyte 18 can be a same or different material. Further, precursor 24 or analyte 18 can be an atom or molecule. The molecule can include the transition metal (e.g., from group 3 to group 12 of the periodic table such as an element from group 10, group 11, group 12, and the like); a p-block element such as an element from group 13, group 15, group 16 of the periodic table, and the like; an allotrope of carbon; or a combination thereof recited as a material for precursor 24 in the preceding paragraph. In a certain embodiment, precursor 24 or analyte 18 can be a polymer or can be an atom or molecule that is polymerized on substrate 6 such that array 4 includes a polymer as analyte 18.

Figure 7:
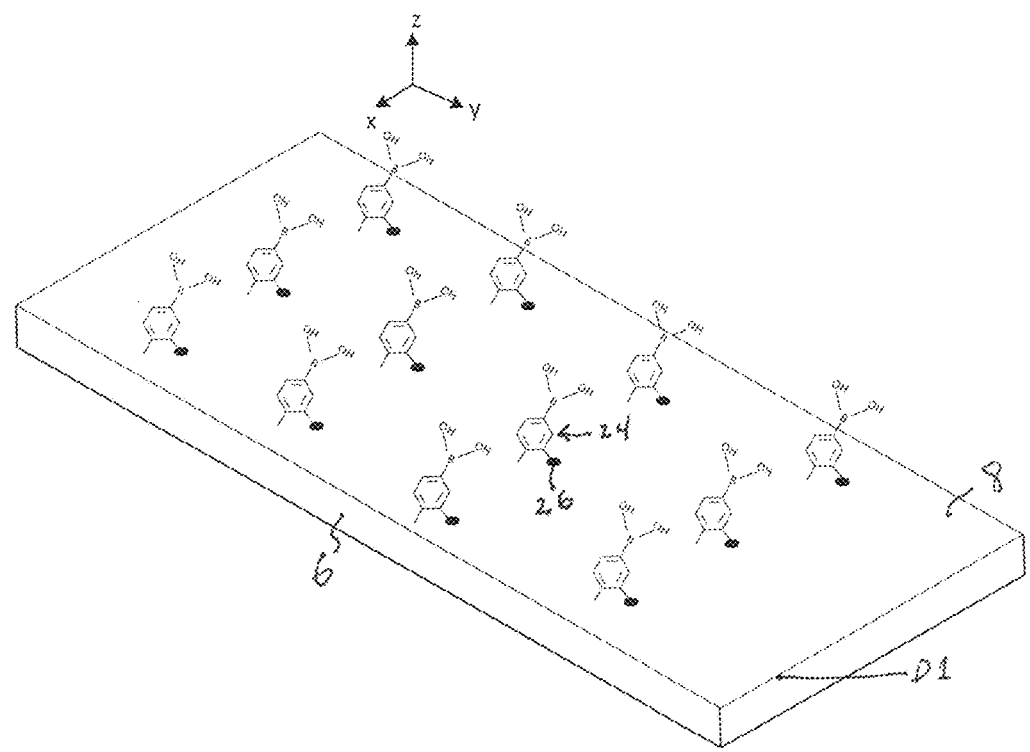
FIG. 7 shows a plurality of precursors disposed on a substrate.

With reference to FIG. 7, in an embodiment, precursor 24 includes an organic molecule such as a functionalized aromatic species, e.g., 3,4-dimethylphenylboronic acid disposed on substrate 2 at attachment point 26. Under the indenting force provided by, e.g., indenter 28 (not shown) in contact with the precursor 24, indentation 14 can be formed in substrate 6 such that analyte 18 is formed from precursor 24 to form array 4. Here, analyte 18 can be 3,4-dimethylphenylboronic acid such that analyte 18 is formed by indenting precursor 24 into substrate 6 without changing an identity of precursor 24. In some embodiments, an identity of precursor 24 is changed during formation of analyte 18.

Figures 8, 9:
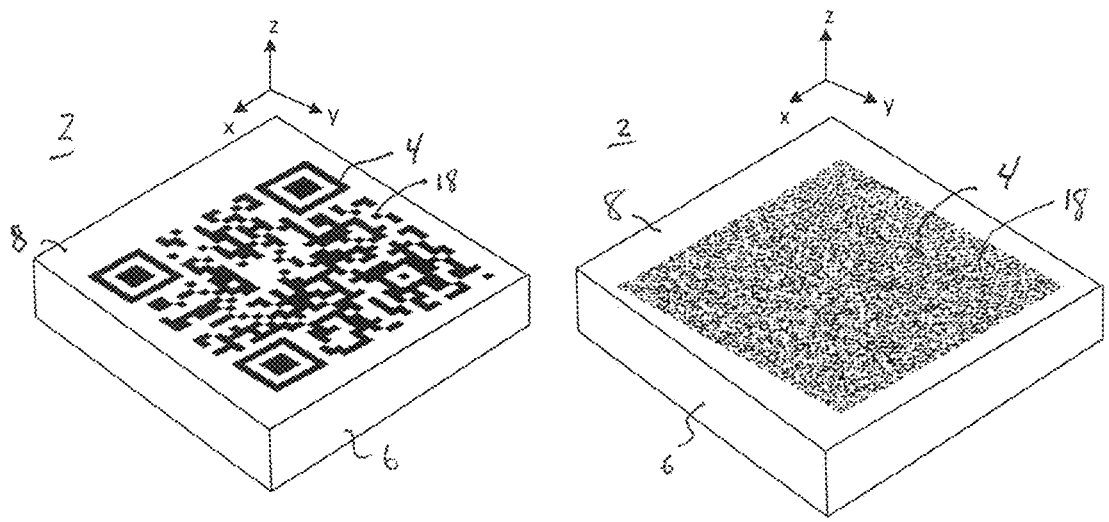
FIG. 8 shows a perspective view of an authentication article.
FIG. 9 shows a perspective view of an authentication article.

In an embodiment, array 4 includes a certificate of authentication, linear barcode, a matrix code, or a combination thereof produced by indenting precursor 24 into substrate 6 to form indentation 14 and analyte 18 disposed in indentation 14. An arrangement of indentations 14 on substrate 6 can be selected to form a shape in a one-dimensional array, a two-dimensional array, and the like. According to an embodiment, array 4 is the matrix barcode that comprises an aztec code, a code 1 barcode, a data matrix barcode, a dense code barcode, a stacked linear barcode, an International Organization for Standardization/International Electrotechnical Commission (ISO/IEC) 18004:2006 barcode, a circular barcode, or a combination comprising at least one of the foregoing matrix barcodes. FIG. 8 and FIG. 9 show array 4 wherein analytes 18 disposed in indentations 14 arranged respectively in a two-dimensional 25×25 matrix barcode (FIG. 8) and a two-dimensional 177×177 matrix barcode (FIG. 9).

In some embodiments of authentication article 2, array 4 is the linear barcode that includes a codabar, a code 25 barcode, a code 11 barcode, a code 39 barcode, a code 49 barcode, a code 93 barcode, a code 128 barcode, a Canadian Post Corporation (CPC) barcode, digital index (DX) film edge barcode, global trade item number (GTIN) barcode, universal product code (UPC) barcode, European article number (EAN) barcode, Japanese article number (JAN) barcode, facing identification mark barcode, intelligent mail barcode, pharmacode barcode, or a combination thereof. It is contemplated that array 4 can include a combination of the matrix barcode and linear barcode.

In an embodiment, authentication article 2 includes a foodstuff, electronic article, mechanical article, currency article, biological article, or a combination thereof. Exemplary foodstuffs include fruit (e.g., a mango, strawberry, and the like), meat, fish, and the like. Exemplary electronic articles include an integrated circuits (IC), microelectromechanical systems (MEMs), discrete electronic component to surface mount on a printed circuit board (PCB), PCB, avionic component, implantable medical electronic device (e.g., including a retinal implant, glucose biosensor, cochlear implant, pacemaker, electrical stimulation therapy device), a device that to connect to and provide communication with the Internet, and the like.

Exemplary mechanical articles include printed, forged, machined or cast fabricated marine, automotive and aerospace parts such as gears and shafts, engineered components used for automotive, engineering and industrial purposes. brakes, tires, passive restraining devices such as seat belts and airbags, machine dies and bits. Exemplary currency articles include plastic, paper and metallic money, financial instrument certificates, such as bonds, stocks, certificated of deposit, letter of credit, and the like.

Exemplary biological articles include implantable medical devices such as artificial replacements for hip, knee, heart, and the like.

In an embodiment, authentication article 2 includes a currency article (e.g., a United States bill paper currency) that includes array 4 with coinage such as copper, silver, gold and non-coinage metals such as cobalt, ruthenium, aluminum, as analytes 18 disposed in a plurality of indentations 14 on the currency article.

Figure 10:
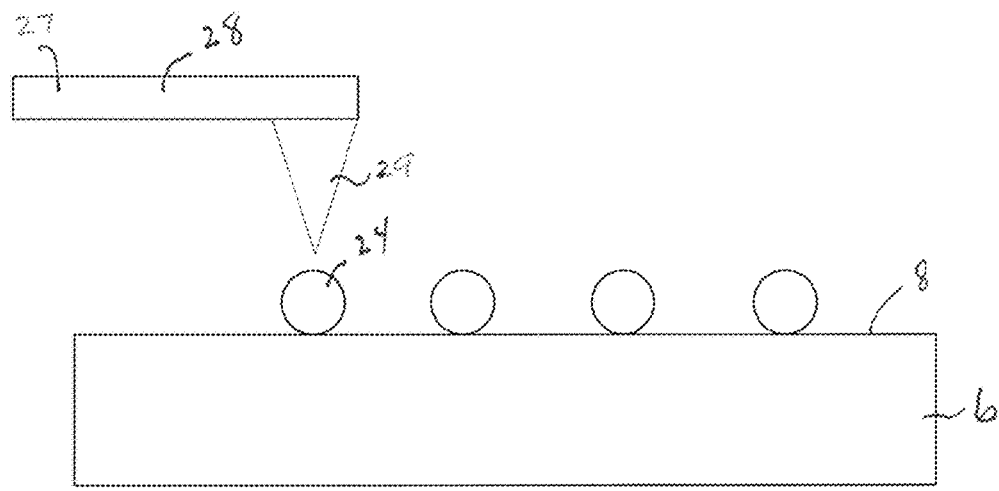
FIG. 10 shows an indenter proximate to a plurality of precursors disposed on a substrate.
Figure 11:
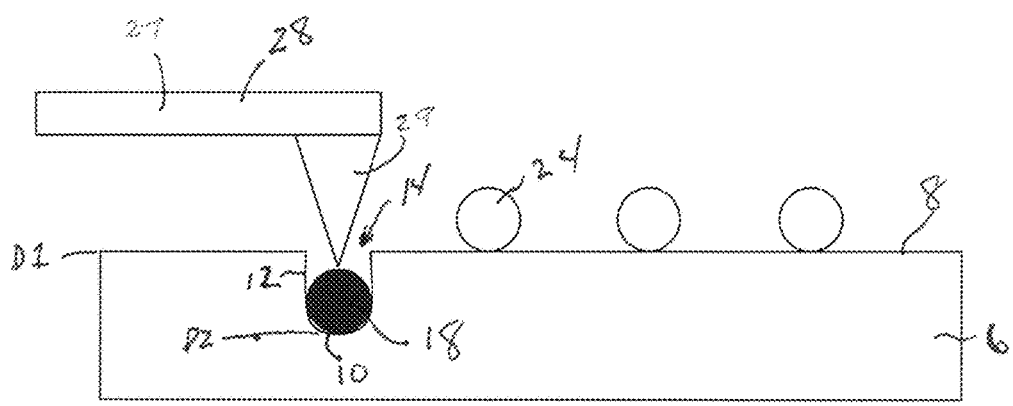
FIG. 11 shows the indenter in contact with an analyte and also shows an indentation formed in the substrate shown in FIG. 10.
Figure 12:
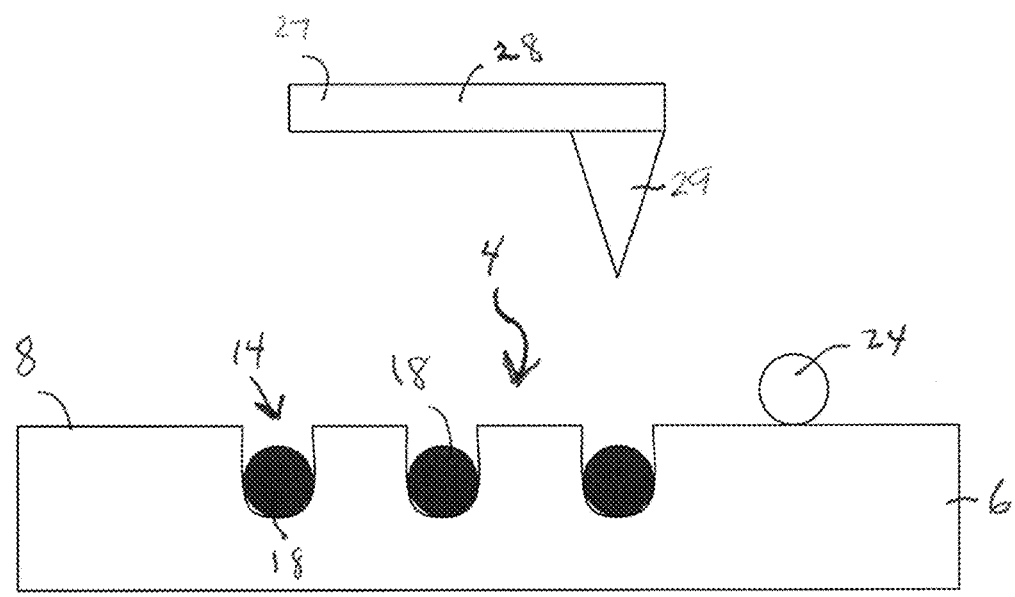
FIG. 12 shows the indenter proximate to a plurality of analytes disposed in indentations disposed in the substrate shown in FIG. 10.
Figure 13:
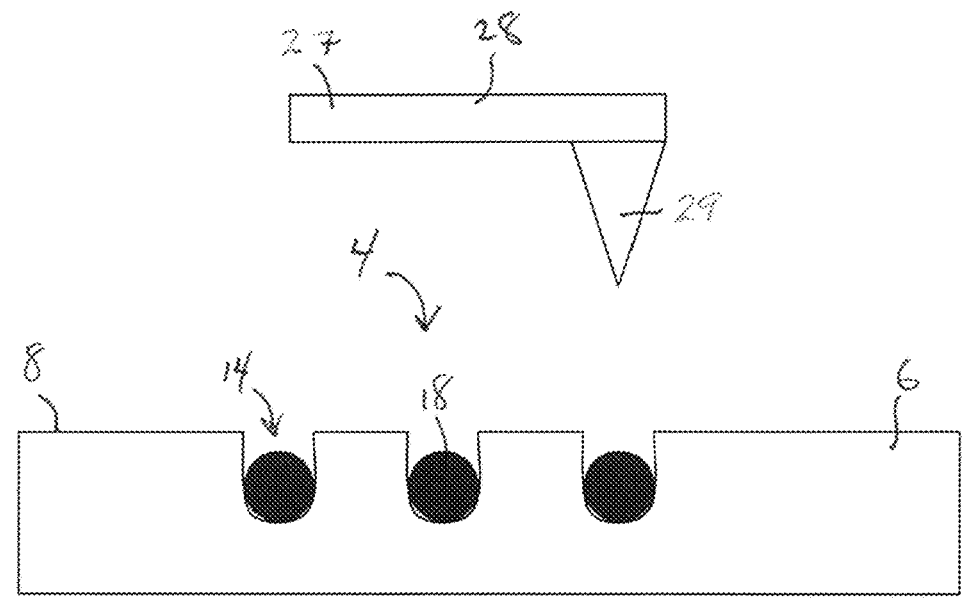
FIG. 13 shows the indenter proximate to the plurality of analytes disposed in indentations after removal of an excess amount precursor from the substrate shown in FIG. 10.

To form indentation 14 in substrate, an indenter can be used. Exemplary indenters 28 include an atomic force microscope probe, an array of independently controlled, punctate probes, a preformed template for stamping and embossing, and the like. The atomic force microscope probe can include cantilever 27 and tip 29, e.g., as shown in FIG. 10.

In an embodiment, with reference to FIG. 10, FIG. 11, FIG. 12, and FIG. 13, a process for making authentication article 2 includes providing substrate 6; disposing precursor 24 on substrate 2; contacting precursor 24 with indenter 28; subjecting, by indenter 28, precursor 24 to an indenting force; indenting, by the indenting force, substrate 6; forming indentation 14 in substrate 6; forming analyte 18 disposed in indentation 14 from precursor 24; and forming array 4 including a plurality of analytes 18 disposed individually in a plurality of indentation 14 to form authentication article 2. According to an embodiment, in the process disposing precursor 24 on substrate 6 includes disposing precursor 24 in an amount in excess of the amount of precursor 24 used to form analyte 18, and the process further includes removing the excess amount of precursor 24 from substrate 6 (cf. FIG. 12 and FIG. 13) and optionally annealing precursor 24 to form analyte 18.

According to an embodiment, authentication article 2 is configured to be authenticated. In an embodiment, a process for authenticating authentication article 2 includes providing authentication article 2; subjecting analytes 18 to a probe stimulus; acquiring a response from the plurality of analytes 18 in response to being subjected to the probe stimulus; and determining whether the response is the authentication signature to authenticate authentication article 2, wherein authentication article 2 is not authenticated if the response is not the authentication signature for the array. The probe stimulus can include an electromagnetic radiation, and the authentication signature can include an electromagnetic signal. In some embodiment, the probe stimulus includes an electrostatic potential, and the authentication signature includes a surface resistivity.

According an embodiment, to prevent unauthorized reproduction of an item such as a counterfeit article, the authentication signature of authentication article 2 is used. The authentication signature is provided on authentic articles and is a known response to a selected probe stimulus. Accordingly, it has been found that for a test article that is being tested for authenticity, the test article can be shown to be authenticate or shown to be counterfeit, based on comparing a response from the test article (produced from being subjected to the probe stimulus) to a known authentication signature associated with the authentic article. When the test article is subjected to the probe stimulus and produces the authentication signature, the test article is deemed to be authenticated as authentication article 2. Otherwise, the test article is subjected to the probe stimulus and fails to produce the authentication signature, and the test article is deemed to be a counterfeit (or defect) of authentication article 2.

Figure 14:
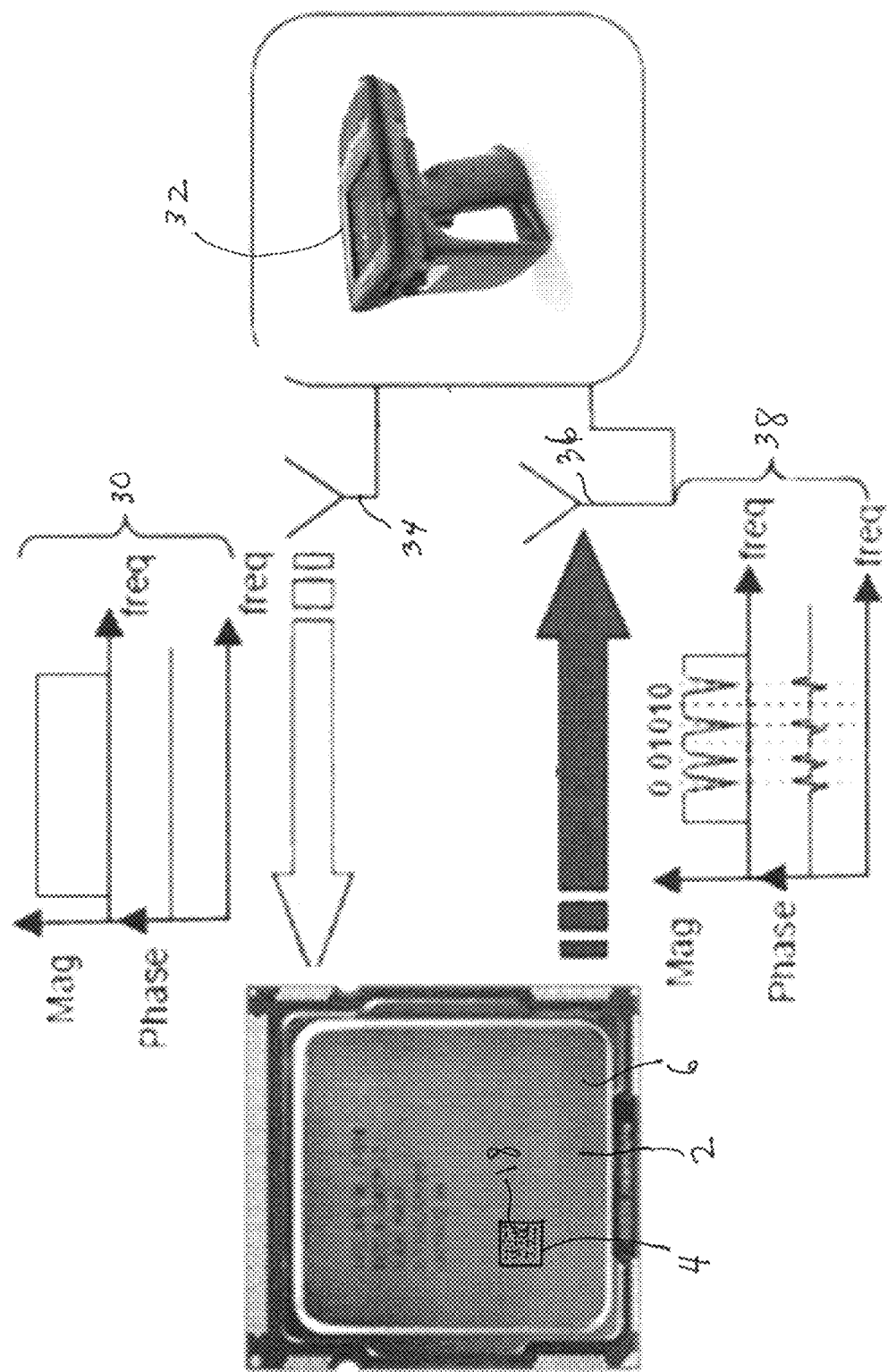
FIG. 14 shows an acquisition of an authentication signature from an authentication article subjected to a probe stimulus.

According to an embodiment, as shown in FIG. 14, a process for authenticating authentication article 2 (e.g., a packaged integrated circuit (IC) that includes array 4 with analytes 18 disposed on an exterior of the IC package) includes providing authentication article 2; subjecting authentication article 2 with probe stimulus 30 from probe 32; producing authentication response 38 from authentication article 2; receiving authentication response 38 by probe 32. It is contemplated that the process for authenticating can be performed on a test article (which can be authentication article 2) in situ or ex situ. For in situ authentication of the test article, the test article is maintained in a native environment. For ex situ authentication of the test article, the test article is not disposed in a native environment. In an embodiment, the test article is a computer processor chip. For in situ authentication of the computer processor chip, the computer processor chip is maintained on a motherboard. For ex situ authentication of the computer processor chip, the computer processor chip can be isolated and tested in an absence of the motherboard.

In an embodiment, probe 32 is configured to communicate probe stimulus 30 to authentication article 2. To accomplish communication of probe stimulus 30, probe 32 can include antenna 34. Probe stimulus 30 can include a waveform that includes a magnitude and phase as a function of frequency, e.g., as shown in FIG. 14. Similarly, probe 32 is configured to receive authentication response 38 from authentication article 2 (or a test article). Probe 32 can include antenna 36 to receive authentication response 38. Authentication response 38 can include a waveform that includes a magnitude and phase as a function of frequency, e.g., as shown in FIG. 14.

Exemplary probes 32 include a combined electromagnetic wave emitter and detector, such as an RFID reader. Probe 32 can be a network connected device having an antenna to send power, data, or commands to authentication article 2. An antenna for probe 32 can convert electrical current into electromagnetic waves that are then radiated into space where the wave can be received by the analyte and converted back to electrical current. The antenna can be selected according to a specific application or environment. Exemplary antennas include linearly-polarized, circularly-polarized antennas. Antennas that radiate linear electric fields have long ranges, and high levels of power that enable their signals to penetrate through different materials to read analyte arrays. Linear antennas can be sensitive to analyte orientation. An antenna that radiates circular fields may be less sensitive to orientation.

Figure 15:
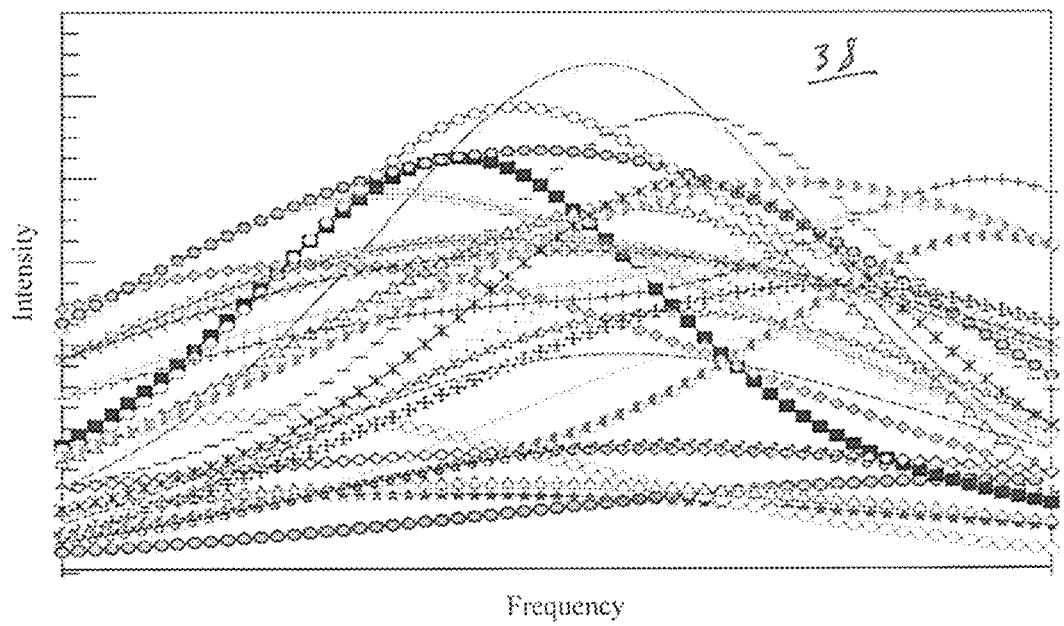
FIG. 15 shows a graph of intensity versus frequency for analytes disposed in the authentication article shown in FIG. 14.
Figure 16:
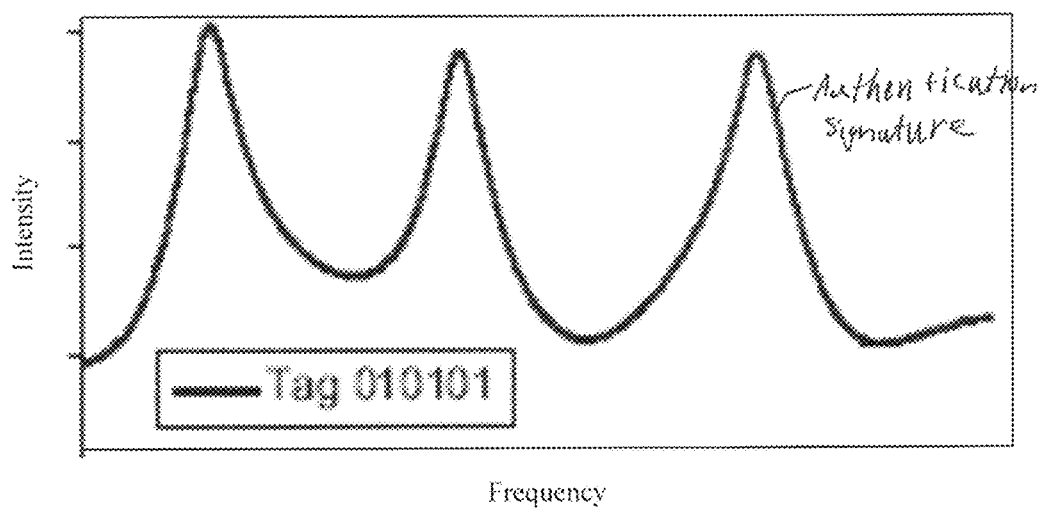
FIG. 16 shows a graph of intensity versus frequency for an authentication signature of the analytes disposed in the authentication article shown in FIG. 14.

Authentication response 38, e.g., received by probe 32 can be a plurality of waveforms, wherein an intensity of each waveform depends on frequency. Such waveform can be different for different analytes 18 in array 4. That is each analyte 18 in array 4 independently can produce a waveform included in authentication response 38. An exemplary authentication response 38 is shown in FIG. 15, which shows a graph of intensity versus intensity for authentication response 38 that includes a plurality of waveforms, each waveform corresponding to an individual response to probe stimulus 30 of individual analyte 18 in array 4. Further, the plurality of waveforms in authentication response 38 (e.g., as shown in FIG. 15) can be analyzed to determine the authentication signature of authentication article 2. An exemplary authentication signature is shown in FIG. 16, which a shows a graph of intensity versus frequency, that is produced by analyzing plurality of waveforms in authentication response 38 shown in FIG. 15. In an embodiment, a test article is subjected to probe stimulus 30 and produces authentication response 38 that is analyzed to produce an overall waveform that is not the authentication signature for authentication article 2 such that the test article is determined to be a counterfeit of authentication article 2. Alternatively, a test article is subjected to probe stimulus 30 and produces authentication response 38 that is analyzed to produce an overall waveform that is the authentication signature for authentication article 2 such that the test article is determined to be authentication article 2 or an authorized version of authentication article 2.

In an embodiment, analytes 18 are selected to produce authentication response 38 (e.g., see FIG. 15) that can be analyzed to produce authenticity signature (e.g., see FIG. 16). It is contemplated that analytes 18 produce authentication response 38 in response to being subjected to probe stimulus 30. Authentication response 38 or probe stimulus 30 independently can be an electromagnetic wavelength such as an optical wavelength, radiofrequency wavelength, and the like.

In an embodiment, the electromagnetic radiation of the probe stimulus includes a frequency from 100 kilohertz (kHz) GHz to 200 GHz. In some embodiment, the frequency is from 1 MHz to 2 MHz for a biological application, from 10 MHz to 20 MHz for proximity reading of financial instruments, from 0.4 GHz to 1 GHz for inanimate object tracking, or from 2 GHz to 5 GHz for large body identification.

In a particular embodiment, the authentication signature includes an electromagnetic signal. The electromagnetic signal can include a frequency from 0.0001 GHz to 200 GHz, specifically from 0.001 to 10 GHz.

In some embodiments, probe stimulus 30 is a potential difference provided by probe 32, wherein probe 32 includes a plurality of electrodes optionally connected to a power source. Electrodes of probe 32 can contact array 4 to provide probe stimulus 30 that includes the potential difference for which analytes 18 in array 4 produce an authentication response 38 that includes a resistivity, e.g., a surface resistivity.

Figure 17:
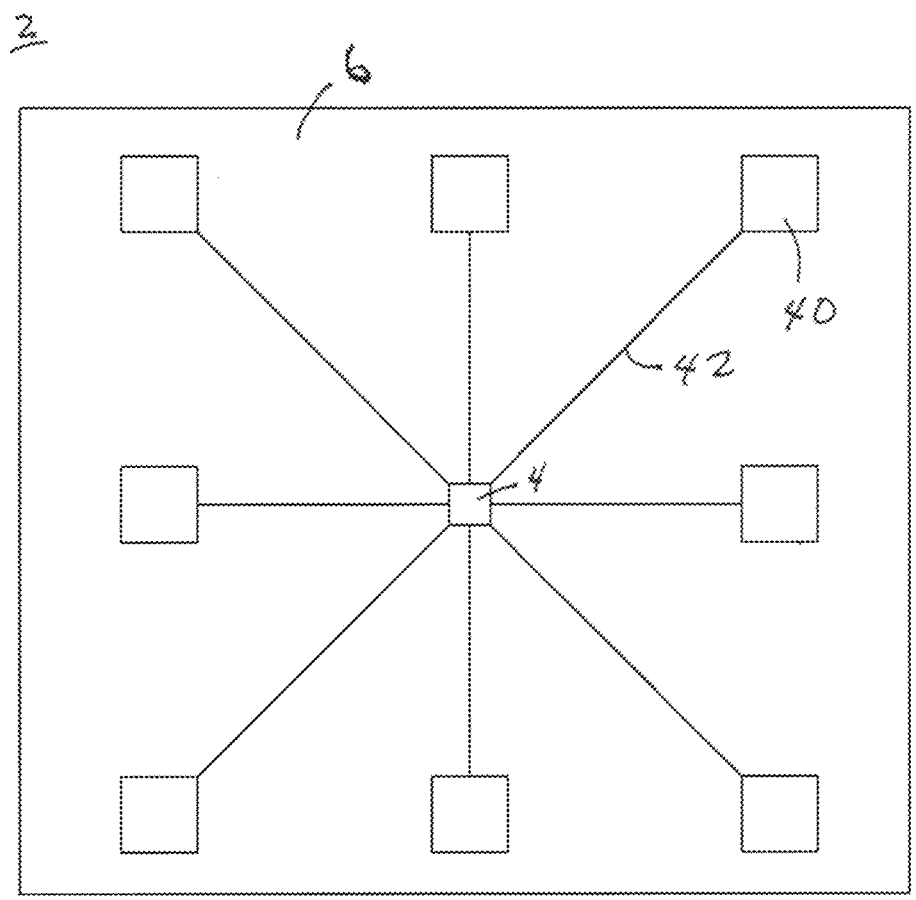
FIG. 17 shows a top view of an authentication article.

According to an embodiment, probe stimulus 30 include an electrostatic potential provided by probe 32 and subjected to authentication article 2, e.g., as shown in FIG. 17. Here, authentication article 2 includes a plurality of electrodes 40 in electrical communication with array 4 via wire 42. Electrodes 40 can be contacted by electrodes from probe 32 such that analytes 18 in array 4 provide authentication response 38 to probe stimulus 30 provided by probe 32. The authentication signature determined by analyzing authentication response 38 acquired by probe 32 from array 4 can include a surface resistivity of array 4. Here, probe 32 can be an electronic scanning probe (eSPM) such as a Kelvin probe, Hall probe, where four-point-probe, where two leads from the probe are used to source current and another two leads are used to measure voltage.

A size of array 4 is scalable. Array 4 can have a size from 1 μm by 1 μm to 3 mm×3 mm, specifically from 10 μm by 10 μm to 500 μm by 500 μm at 500 nm spacing. A volume of array 4 can be from 500 $nm^3$ to $5\times10^6$ $nm^3$, specifically from $1\times10^5$ $nm^3$ to $5\times10^5$ $nm^3$.

A number of analytes in array 4 can be selected. It is contemplated that the number of analytes can be from 50 to 2000, specifically from 100 to 1000.

The articles and processes herein are illustrated further by the following Examples, which are non-limiting.

EXAMPLES

Example 1. Preparation of Authentication Article

An n-type silicon (100) substrate (1-10 Ω·cm) was pre-cleaned with (RCA) cleans, designed to remove adventitious organic contaminants, naturally occurring silicon oxides and ionic contamination on the silicon substrate, and processed in an electron-beam evaporator to deposit an 15 nm thick Al blanket over-layer. Experiments were performed using an AFM system (commercially available as Dimension 5000 and Nanoscope V from Bruker, Camarillo, Calif.). The AFM system had a modified ramping mode. Diamond-coated AFM tips (spring constant, k: ≈42 N/m) were used to form nano-indentation in the substrate. The tip load was increased to make the tip a reliable electric contact for the aluminum over-layer and silicon interface by having slight plastic deformation on the Si surface. In addition to the mechanical load on the AFM tip, a brief pulse (≈20 ms) of DC bias of 8 V as the peak load was applied by the AFM tip. This supported diffusion of ionized aluminum atoms into the silicon surface. After indenting the substrate, analytes were activated by a flash thermal annealing at 600° C. in $N_2$ gas for 20 s after removing the aluminum overlayer using chemical wet etching.

Example 2. Probing

To understand the electrical state of the array of analytes on the substrate, AFM nano-indentation was performed on the same substrate without having the aluminum over-layer. The indentation of analytes and AFM nano-indentation without analytes present were performed based on conditions that included probe contact pressure and optional subsequent annealing.

Incorporation of Al analytes into the silicon altered the local electrical properties of the substrate. Since the average width of the electrically modified area using from indentation with analytes was less than 100 nm, high spatial resolution was used for the electrical measurement. A minimum spatial resolution to measure the array formed by indentation with analytes is about 20 nm. To detect an electrical activity of the analyte-doped regions after indentation, a scanning Kelvin probe microscope (SKPM) was used and provided measurement of a contact potential difference (CPD) between the tip of the AFM probe and the sample on a dimension at a nano-scale.

During the scanning of the sample by the SKPM, the SKPM applied an AC bias to the tip to produce an electrostatic force on the cantilever, which was proportional to the CPD between the tip and the sample. The SKPM was used to measure the surface potential changes in the array of indentation-aluminum analyte-doped silicon and AFM nano-indented silicon defects (without the Al analytes). The samples were pre-cleaned with RCA cleaning before the SKPM measurement.

Prior to the analyte indentation experiments, the tip loads for the two different types of materials, silicon and aluminum, were calculated by using a Hertz model, as described in H. Hertz, J. Reine, Angew. Math. 92 (1881) 156, which is incorporated herein in its entirety. The calculation was made based on the parameters shown in Table 1.

TABLE 1

| Sample | Young's modulus | Poisson's ratio | Spring constant |
|---|---|---|---|
| Silicon (100), n-type | 130 Gpa | 0.18 | — |
| Aluminum | 69 Gpa | 0.32 | — |
| AFM tip, diamond coated | 1140 Gpa | 0 | 42 N/m |

Figure 18:
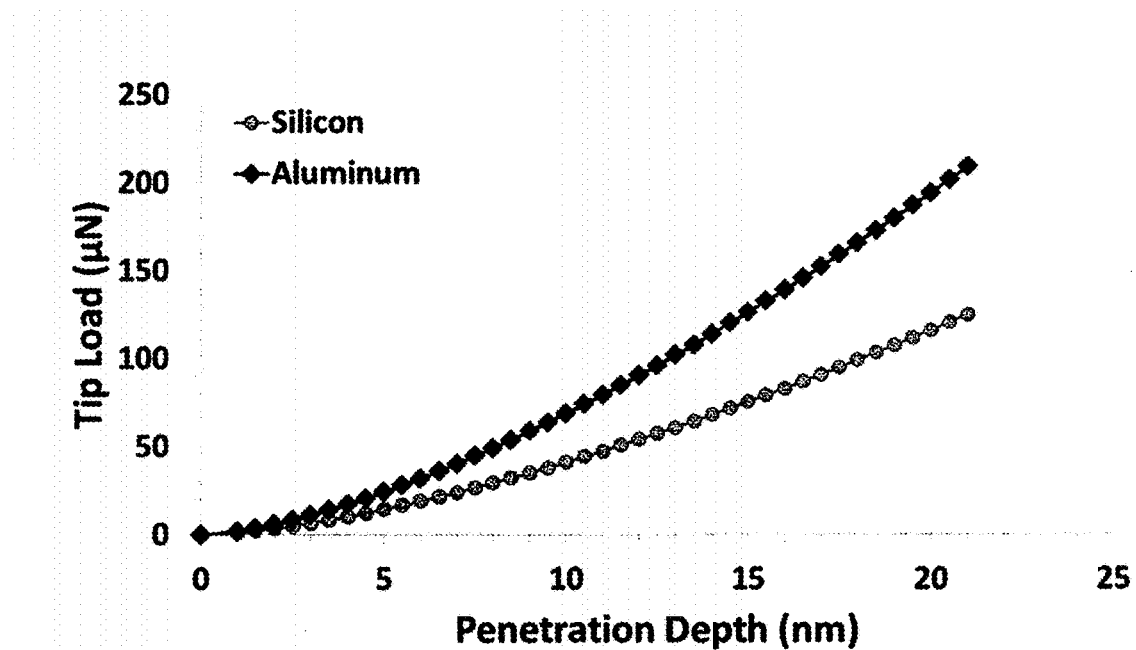
FIG. 18 shows a graph of tip load versus penetration depth.
Figure 19:
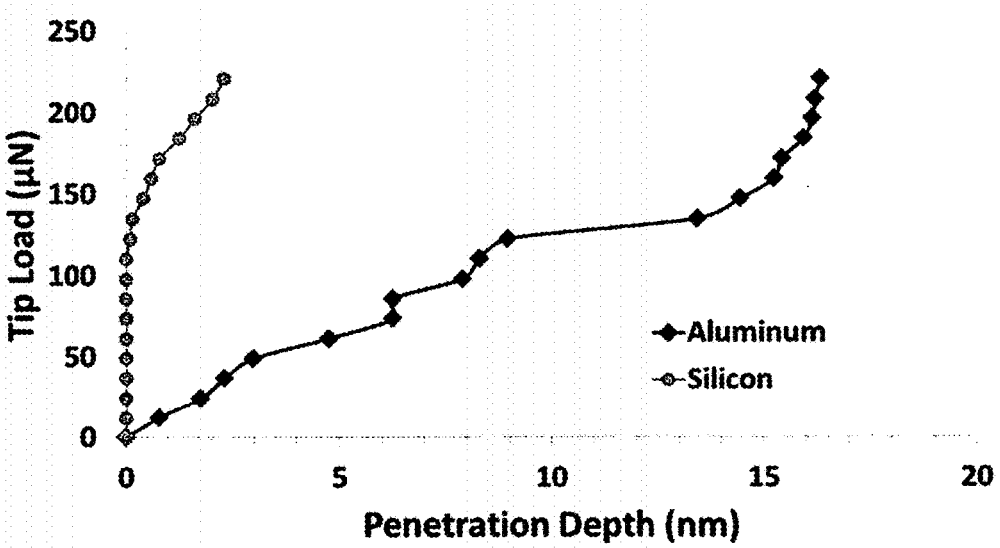
FIG. 19 shows a graph of tip load versus penetration depth.
Figure 20:
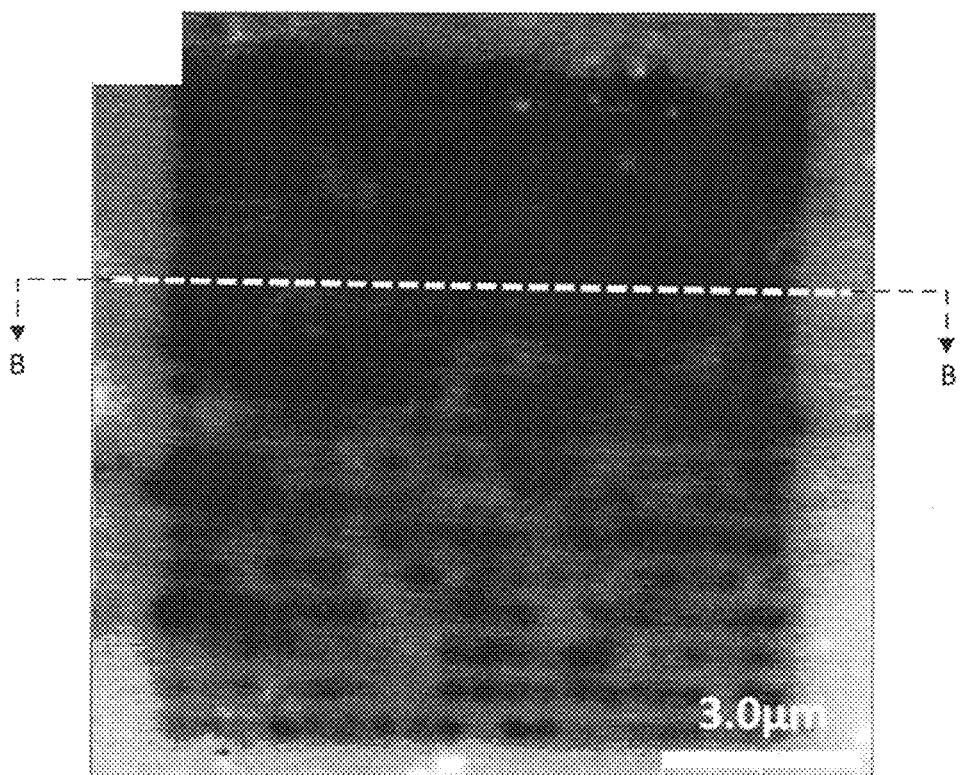
FIG. 20 shows an image of contact potential difference (CPD) for a sample according to Example 2.
Figure 21:
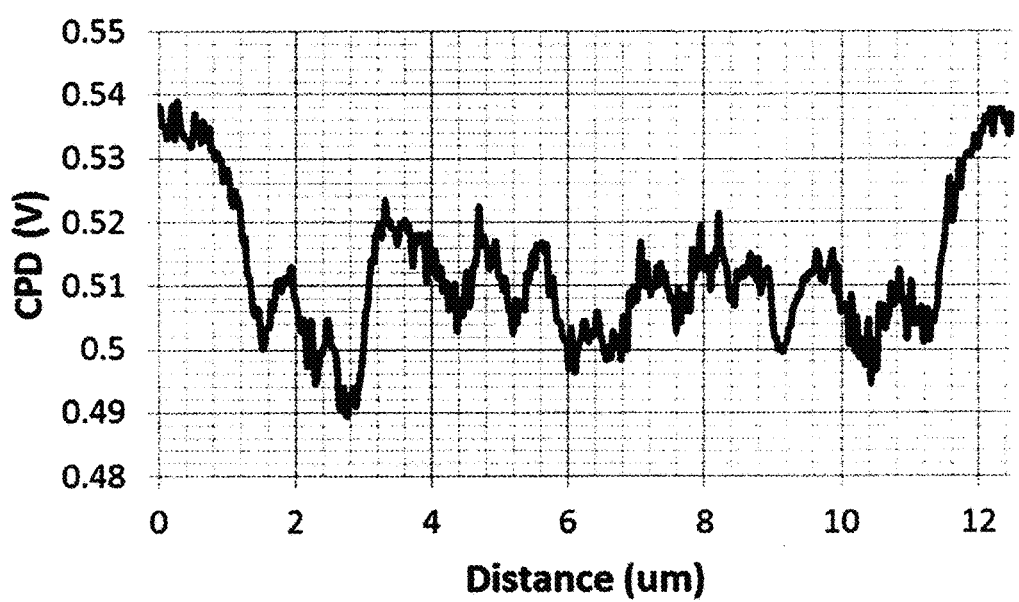
FIG. 21 shows a graph of CPD versus distance along line B-B for the image shown in FIG. 20.

The calculated tip loads on aluminum and silicon are shown in FIG. 18, which shows a graph of tip load versus penetration depth. FIG. 19 shows a graph of tip load versus penetration depth for a variation of tip loads extracted from experimentally recorded $V_{TT}$, from 0 mV to 9000 mV that was converted to a force scale, from 0 μN to 221 μN. Data in FIG. 18 and FIG. 19 show identical elastic and plastic behaviors during indentation of the aluminum overlayer. Considering the initial roughness on the silicon surface (<1 nm), no plastic deformation appears until the tip load reaches 184 μN. The step-like changes in tip loads after the yield load point were not offsets of the Hertz curve but were due to an anomalous response as the tip penetrated further into the aluminum film, which resulted in increased contact radius at the AFM tip. FIG. 20 shows a CPD image determined by data acquired by the SKPM of the array of Al injected area of 20×20 arrays in a 10×10 μm² area. FIG. 21 shows a graph of CPD versus distance along line B-B for the image shown in FIG. 20.

The measured CPD was determined as the difference between the sample surface potential and the tip work function. The size of the indentations varied between 60 nm and 100 nm as measured from the CPD images based on the potential variation at the array with the analyte. FIG. 20 shows an image of (CPD) for this sample. Additionally, FIG. 21 shows a graph of CPD versus distance for the image along line B-B for the image shown in FIG. 20. The CPD data shown in FIG. 21 were more negative than the pristine substrate, wherein the surface doping state was substantially changed, and the Fermi energy lowering at the surface resulted from an increasing number of holes in the silicon surface due to the indentation of the substrate with the analytes. The CPD changes of the analyte array compared to the substrate varied from 25 mV to 50 mV under the same sample preparation conditions.

Figure 22:
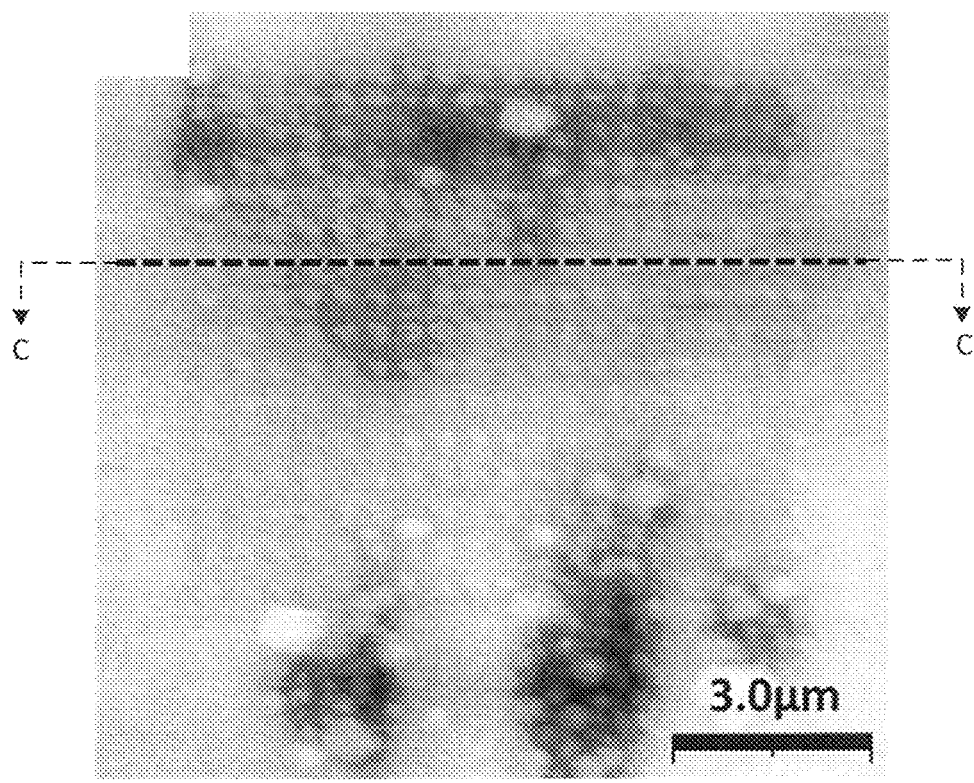
FIG. 22 shows an image of contact potential difference (CPD) for a sample according to Example 2.

The contact potential measured by SKPM was a relative difference between the electrically modified and as-received substrates, not an absolute difference in electrochemical potential of substrates. As a control experiment, we performed AFM nano-indentation on the same silicon substrate without an overlayer, to generate controlled defects in the silicon substrate. The SKPM-CPD images of these AFM nano-indented surface defects are shown in FIG. 22.

The CPD data in the as-received substrate was close to 0 mV (see FIG. 23) and differed markedly from that of the substrate with the analyte array (CPD~540 mV). While the observed difference could be attributed to the changing work function of metal coated (Pt/Ir) tip due to tip wear to expose the core silicon during the AFM scanning, the difference in work function of tip can be neglected since the SKPM data is the relative difference in contact potential between the tip and the substrate, and not the absolute potential value. Furthermore, since the analyte array was made under ambient condition and the tip was dc-biased during making the analyte array, local oxide structures were formed along with the arrays, which insulates the substrate and distorted CPD data.

Figure 23:
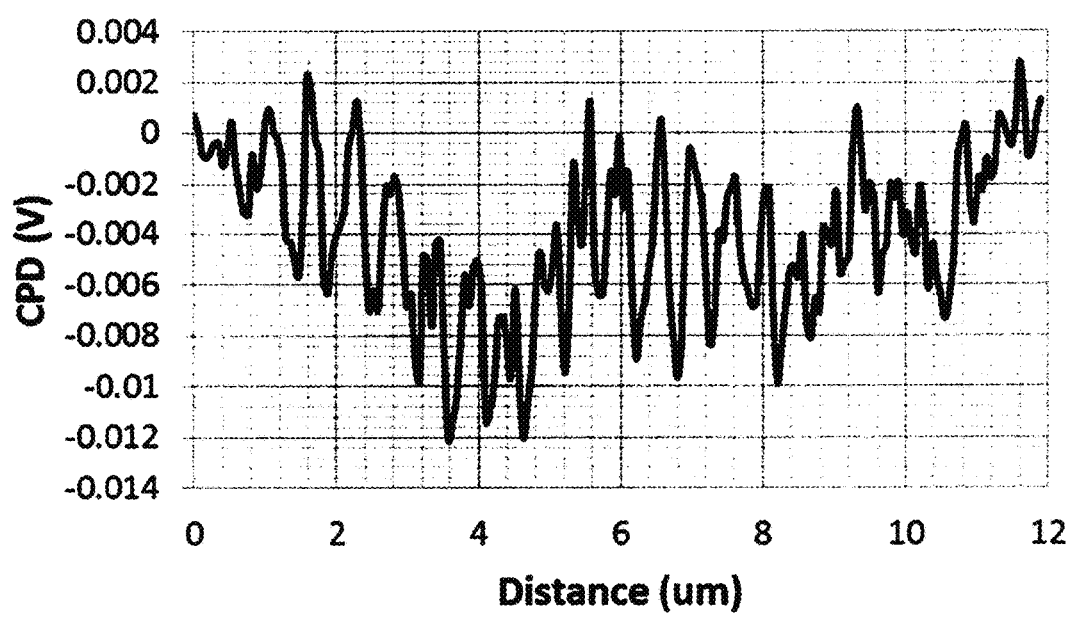
FIG. 23 shows a graph of CPD versus distance along line C-C for the image shown in FIG. 22.

The CPD data in FIG. 23 shows generally negative values compared to the as-received substrate. The difference in CPD was 1 mV to 10 mV, which was less than that for the analyte array. These changes in CPD at nano-indented defects can occur due to an increase of lattice strain in silicon crystal from an increase in potential energy of the silicon crystal. The large CPD values on the aluminum analyte-doped samples suggest that the aluminum atoms in the silicon substrate were electrically activated and caused larger shifts in potential energy than the nano-indentations without the analyte.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. An authentication article comprising:
   a stratified substrate comprising:
      a first surface;
      a second surface disposed laterally to the first surface and at a depth below the first surface; and
      a plurality of indentations disposed at an air-substrate interface comprising the depth at the second surface of the substrate; and an array disposed on the substrate and comprising a plurality of non-biological analytes, the non-biological analytes being disposed in the indentations and provided to emit an authentication signature in response to being subjected to a probe stimulus, the probe stimulus comprising electromagnetic radiation with a waveform that includes a magnitude and a phase as a function of frequency.

2. The authentication article of claim 1, wherein the substrate comprises a paper, a polymer, a semiconductor, an electrical insulator, a ceramic, a glass, wood, or a combination comprising at least one of the foregoing.

3. The authentication article of claim 1, wherein the authentication article comprises a foodstuff, an electronic article, a mechanical article, a currency article, a biological article, or a combination comprising at least one of the foregoing.

4. The authentication article of claim 1, wherein the analytes independently comprise an element from group 10, group 11, group 12, group 13, group 15, group 16 of the periodic table; an allotrope of carbon; or a combination comprising at least one of the foregoing.

5. The authentication article of claim 1, wherein the array comprises a certificate of authentication, linear barcode, a matrix code, or a combination comprising at least one of the foregoing.

6. The authentication article of claim 5, wherein the array is the matrix barcode that comprises an aztec code, a code 1 barcode, a data matrix barcode, a dense code barcode, a stacked linear barcode, an International Organization for Standardization/International Electrotechnical Commission (ISO/IEC) 18004:2006 barcode, a circular barcode, or a combination comprising at least one of the foregoing matrix barcodes.

7. The authentication article of claim 5, wherein the array is the linear barcode that comprises a codabar, a code 25 barcode, a code 11 barcode, a code 39 barcode, a code 49 barcode, a code 93 barcode, a code 128 barcode, a Canadian Post Corporation (CPC) barcode, digital index (DX) film edge barcode, global trade item number (GTIN) barcode, universal product code (UPC) barcode, European article number (EAN) barcode, Japanese article number (JAN) barcode, facing identification mark barcode, intelligent mail barcode, pharmacode barcode, or a combination comprising at least one of the foregoing linear barcodes.

8. The authentication article of claim 1, wherein the probe stimulus comprises electromagnetic radiation.

9. The authentication article of claim 8, wherein the electromagnetic radiation comprises a frequency from 1 GHz to 200 GHz.

10. The authentication article of claim 8, wherein the electromagnetic radiation comprises a wavelength from 300 nm to 1100 nm.

11. The authentication article of claim 8, wherein the authentication signature comprises an electromagnetic signal.

12. The authentication article of claim 11, wherein the electromagnetic signal comprises a frequency from 1 GHz to 200 GHz.

13. The authentication article of claim 11, wherein the electromagnetic signal comprises a wavelength from 300 nm to 1100 nm.

14. The authentication article of claim 1, wherein the probe stimulus comprises an electrostatic potential.

15. The authentication article of claim 14, wherein the authentication signature comprises a surface resistivity.

* * * * *